(12) United States Patent
Konosu

(10) Patent No.: US 9,423,857 B2
(45) Date of Patent: Aug. 23, 2016

(54) APPARATUS AND METHOD FOR EXTENDING LIFE OF A STORAGE UNIT BY DELAYING TRANSITIONING TO A HIBERNATION STATE FOR A PREDETERMINED TIME CALCULATED BASED ON A NUMBER OF WRITING TIMES OF THE STORAGE UNIT

(71) Applicant: CANON KABUSHIKI KAISHA, Tokyo (JP)

(72) Inventor: Yuichi Konosu, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 379 days.

(21) Appl. No.: 13/779,555

(22) Filed: Feb. 27, 2013

(65) Prior Publication Data

US 2013/0227325 A1 Aug. 29, 2013

(30) Foreign Application Priority Data

Feb. 29, 2012 (JP) ................................ 2012-043961

(51) Int. Cl.
*G06F 1/00* (2006.01)
*G06F 1/32* (2006.01)
*G06F 3/06* (2006.01)
*G06F 12/02* (2006.01)

(52) U.S. Cl.
CPC ............ *G06F 1/3234* (2013.01); *G06F 1/3284* (2013.01); *G06F 1/3203* (2013.01); *G06F 3/0625* (2013.01); *G06F 3/0634* (2013.01); *G06F 3/0679* (2013.01); *G06F 3/0688* (2013.01); *G06F 12/0246* (2013.01); *G06F 2212/1036* (2013.01); *G06F 2212/222* (2013.01); *Y02B 60/1267* (2013.01)

(58) Field of Classification Search
CPC . G06F 12/0246; G06F 3/0688; G06F 3/0679; G06F 2212/222; G06F 2212/1036; G06F 1/3203; G06F 3/0625; G06F 3/0634
USPC .......................................... 713/323; 711/103
See application file for complete search history.

(56) References Cited

U.S. PATENT DOCUMENTS 8,572,422 B2 * 10/2013 Fukuyama .................... 713/324
2011/0157653 A1 * 6/2011 Oku ....................... G06K 15/408
358/1.16
2011/0238890 A1 * 9/2011 Sukegawa ..................... 711/103

FOREIGN PATENT DOCUMENTS

JP 2010-218399 A 9/2010

* cited by examiner

*Primary Examiner* — Xuxing Chen
(74) *Attorney, Agent, or Firm* — Canon USA, Inc. IP Division

(57) ABSTRACT

The present invention relates to a job processing apparatus including an instruction unit configured to provide an instruction to shift a power supply to an OFF state, a setting unit configured to variably set a suspended time for shifting from a suspended state to the OFF state based on a threshold of the number of rewritable times calculated by a calculation unit and a number of writing times, and a control unit configured to shift the power supply to the OFF state after the suspended time set by the setting unit has lapsed.

10 Claims, 11 Drawing Sheets

POWER-ON STATE

SUSPENDED STATE

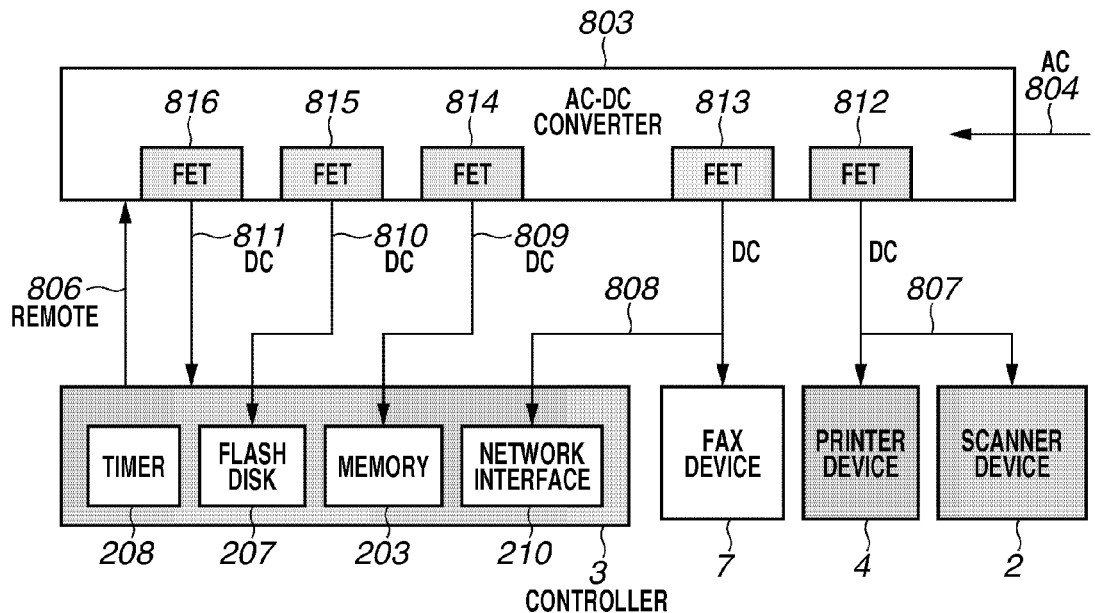
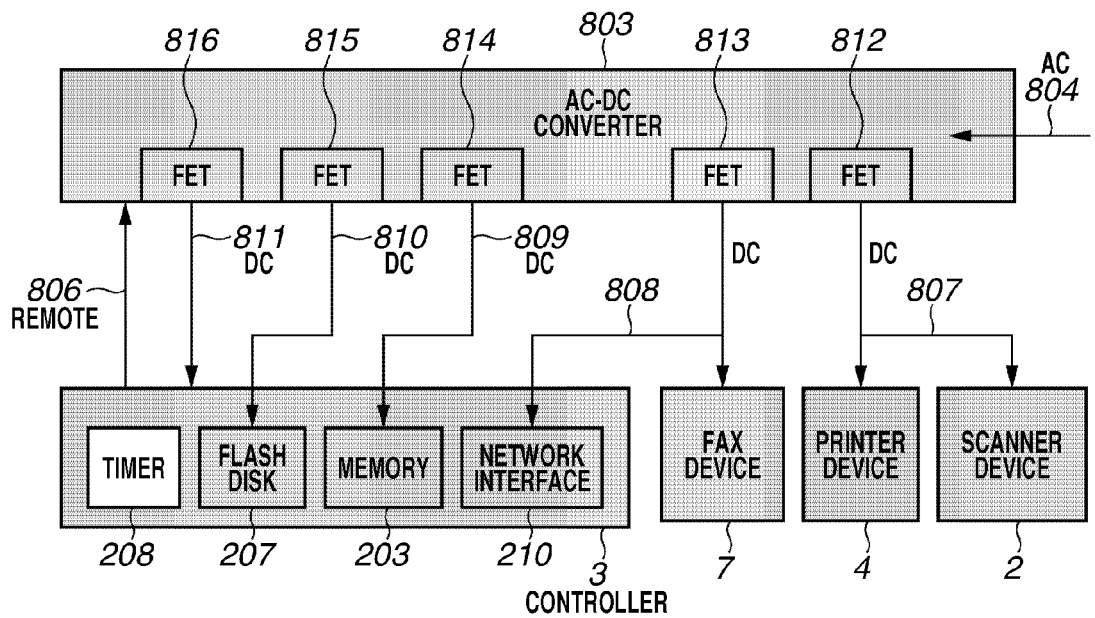

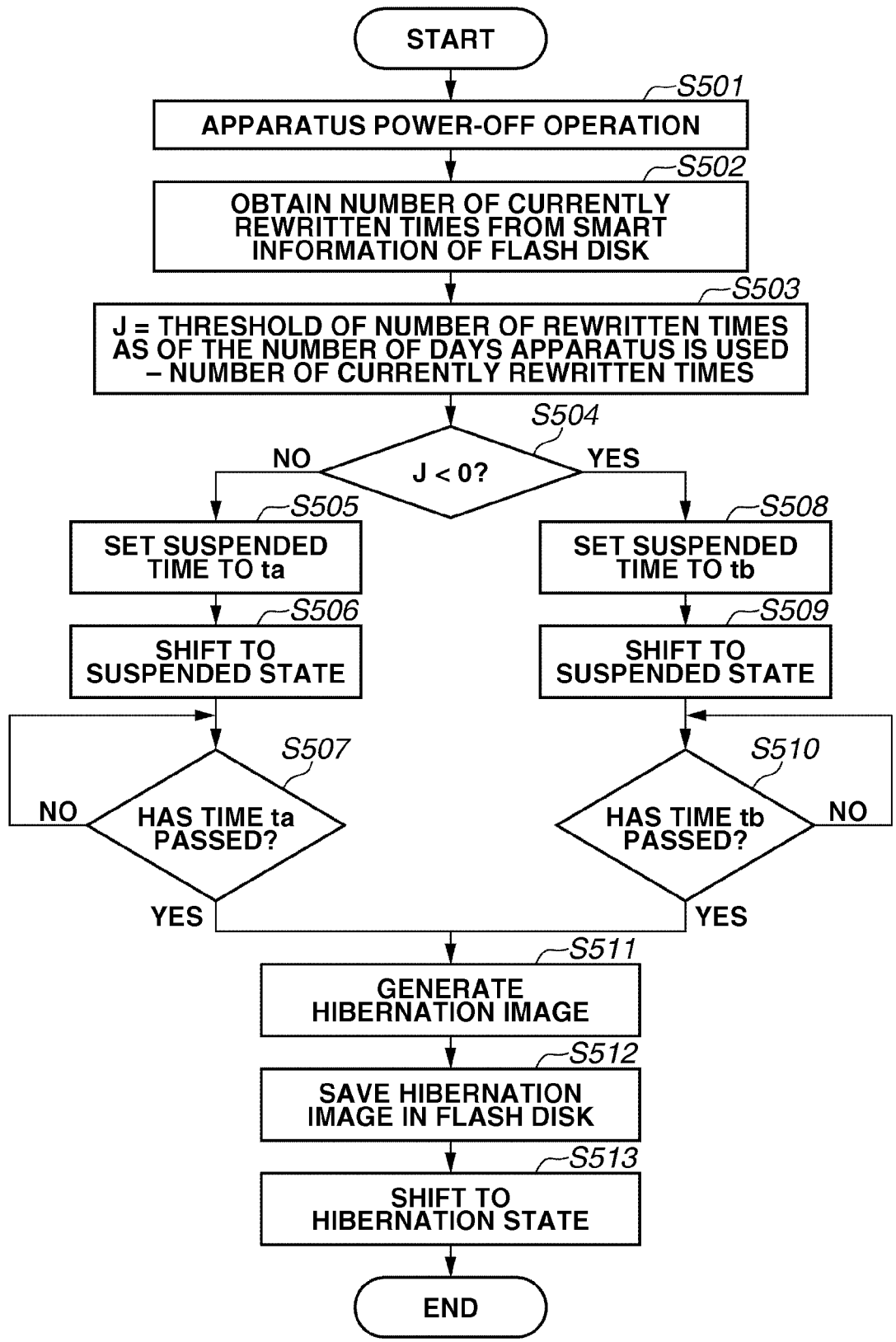

— 1 —

APPARATUS AND METHOD FOR EXTENDING LIFE OF A STORAGE UNIT BY DELAYING TRANSITIONING TO A HIBERNATION STATE FOR A PREDETERMINED TIME CALCULATED BASED ON A NUMBER OF WRITING TIMES OF THE STORAGE UNIT

BACKGROUND OF THE INVENTION

1. Field of the Invention

The present invention relates to an information processing apparatus, control method of the information processing apparatus, and a storage medium.

2. Description of the Related Art

According to increase of a volume of software composing a system to be installed in a job processing apparatus, a period of time starting from an operation of a power switch until a completion of a start-up of the system (i.e., a system starting time) tends to increase.

The tendency is also seen in a multifunction peripheral performing, for example, copying. The tendency more increases as functions of, for example, a copy function, a print function, a facsimile function, are added to the multifunction peripheral. More specifically, the increase of the functions increases the starting time. In order to solve the problem of the increase of the starting time, a suspension technique and a hibernation technique are employed.

In the text, the suspend technique (hereinafter referred to as "suspend") is a technique in which information on a volatile storage (i.e., a memory) of a system at an arbitrary point of time is stored in the volatile storage itself and, upon the next start-up of the system, the information on the memory is read out to restore the system to the "state when the information is stored".

On the other hand, the hibernation technique (hereinafter referred to as "hibernation") is a technique in which information on a volatile storage (i.e., a memory) at an arbitrary point of time is temporarily saved and stored in a nonvolatile storage as a hibernation image and, upon the next start-up of the system, thus saved and stored hibernation image is rewritten into a volatile storage, thereby restoring the system to the "state when the information is saved and stored".

An access speed of a typical volatile storage is faster than that of a typical nonvolatile storage, i.e., the typical volatile storage requires no time for rewriting, the next system starting time can be shortened more in the suspension technique than in the hibernation technique.

However, a power supply of the system can be completely shutdown in the nonvolatile storage while the volatile storage requires continuous energization for the sake of information storage, so that the hibernation technique can achieve more power-saving than the suspension technique. Japanese Patent Application Laid-Open No. 2010-218399 discusses that a combined use of the suspension technique and the hibernation technique can realize both of the shortening of the next system starting time and the power-saving.

Examples of the nonvolatile storage include a hard disk drive (HDD), a storage medium on a flash memory basis such as a solid state drive (SSD), a universal serial bus (USB) memory (hereinafter collectively referred to as "flash memory"). However, the HDD takes time for spin up and thus is unfavorable in the light of an effort in reducing a system starting time.

There is such a problem that the HDD is too fragile for storing material information relating to the start-up of the system, resulting in inviting less reliability.

— 2 —

On the other hand, the flash memory requires shorter time for initialization and is not fragile, so that the flash memory tends to be employed as a nonvolatile storage.

However, an upper limit in number of rewrite times is set for the flash memory as the nonvolatile memory.

FIG. 10 is a performance mapping illustrating number of rewritable times per Block of the flash memory. In the performance mapping, the vertical axis indicates the number of rewritable times and the horizontal axis indicates a bit per Block.

The flash memory in which the number of bits to be stored per Block is one bit is referred to as a single level cell (SLC) type flash memory 601. The flash memory in which the number of bits to be stored per Block is two bits is referred to as a multiple level cell (MLC) type flash memory 602. The flash memory in which the number of bits to be stored per Block is three bits is referred to as a triple level cell (TLC) type flash memory 603.

In FIG. 10, 5×nm 604, 3×nm 605, and 2×nm 606 indicate a semiconductor fabrication process, respectively. In the semiconductor fabrication process, as a numerical value becomes smaller, a higher integration and a lower voltage can be achieved, however, the cost becomes higher and an electrical strength becomes lower. In the text, the SLC type flash memory and the MLC type flash memory are exemplified since they are main stream of the storage device in the current market.

With reference to FIG. 10, it is found that the SLC type flash memory is advantageous in the number of rewritable times per Block in comparison with the MLC type flash memory. However, the MLC type flash memory has larger memory capacity per Block than the SLC type flash memory. Therefore, in a case of the same number of Blocks (i.e., the same volume), the MLC type flash memory can be made into a greater capacity, and, in a case of the same capacity, the MLC type flash memory can be produced with lower cost. In the light of the above, it is so considered that the MLC type flash memory will be a main stream of the memories in future.

For example, in a case where the MLC type flash memory as the nonvolatile storage having the above described characteristics is employed as the job processing apparatus of an image forming apparatus, the number of rewritable times may rather shorten the service life of the image forming apparatus.

Based on the above described characteristics, for shortening the system starting time, required is a start-up control flexible with respect to an affect to be exerted to the power-saving and the service life of an apparatus according to the characteristics of the nonvolatile memory to be employed.

SUMMARY OF THE INVENTION

The present invention is directed to a system capable of realizing a power saving control in which, even in a case where the power saving control is conducted by using a storage unit having different characteristics, a period of time until the system is returned is not extended and a period of time until the number of writing times reaches a limit is not shorten.

According to an aspect of the present invention, an information processing apparatus having a hibernation mode using a nonvolatile storage medium and a suspended mode using a volatile storage medium, the apparatus includes a sensing unit configured to sense that a condition for the information processing apparatus to be shifted to the hibernation mode or the suspended mode is satisfied, a detection unit configured to detect the number of rewritten times of data with respect to the nonvolatile storage medium, and a control unit configured, in a case where the sensing unit senses that the condition is satisfied, to shift the information processing apparatus to either one of the hibernation mode or the suspended mode based on the number of rewritten times detected by the detection unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 7A, 7B, 7C and 7D illustrate how to control the power supply of the job processing apparatus.

FIG. 8 is a flow chart illustrating a control method for controlling the job processing apparatus.

DESCRIPTION OF THE EMBODIMENTS

Various exemplary embodiments, features, and aspects of the invention will be described in detail below with reference to the drawings.

The below described exemplary embodiments do not restrict the present invention as recited in the scope of the claims of the present invention and all the features and any combination thereof according to the present exemplary embodiments are not always essential to solve the problems of the present invention.

Description of System Configuration

Figure 1:
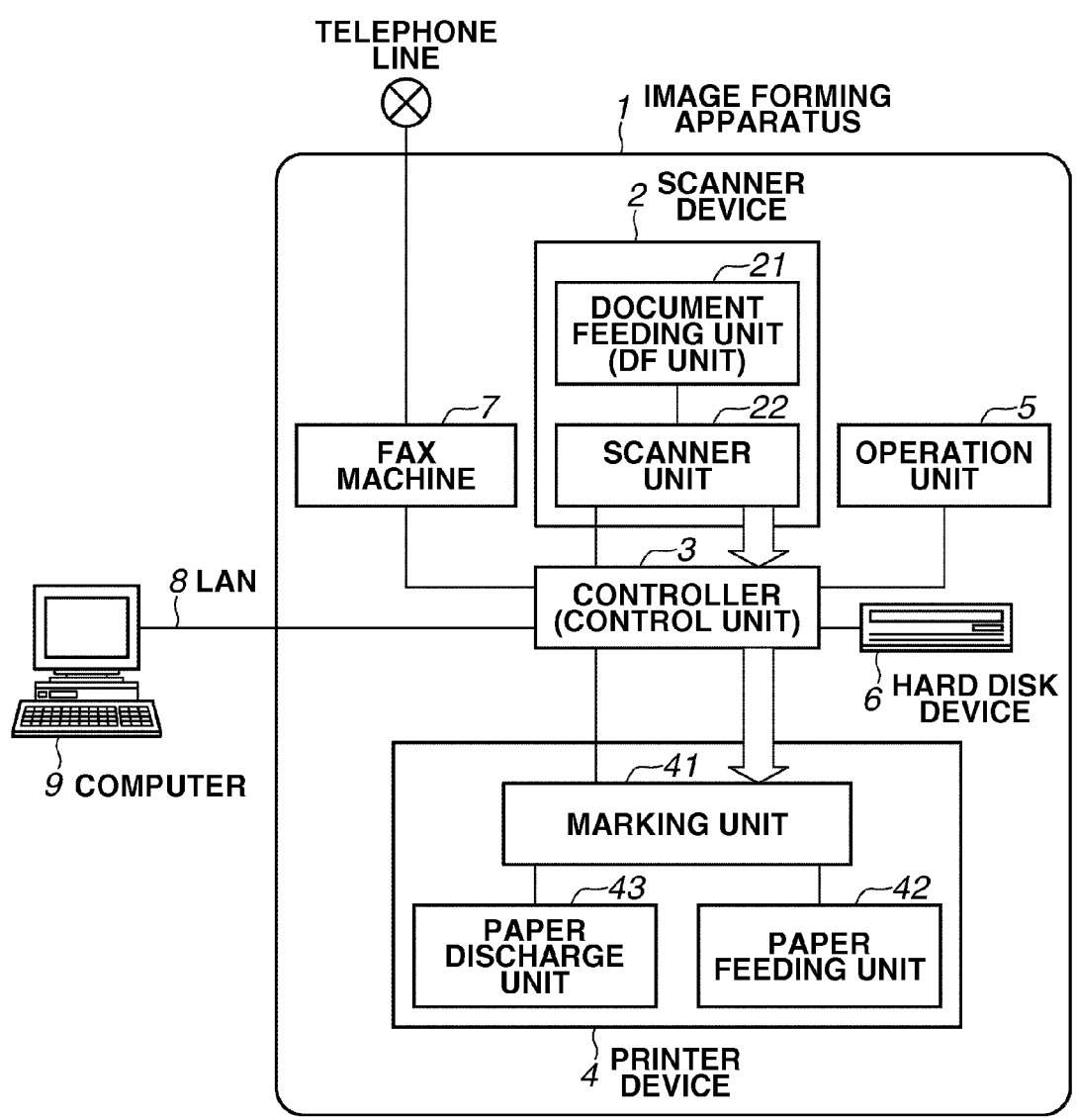
FIG. 1 is a block diagram illustrating a configuration of a job processing system.

A first exemplary embodiment is described below. FIG. 1 is a block diagram illustrating a configuration of a job processing system to which the job processing apparatus according to the present exemplary embodiment is applied. FIG. 1 corresponds to a job processing system for causing a computer 9 to communicate with an image forming apparatus 1 via a local area network (LAN) 8. In the present exemplary embodiment, as an example of the job processing apparatus, a Multi Function Printer (MFP) as an image forming apparatus is exemplified. However, the present invention can also be applied to, for example, a printer device, a facsimile device, and the other electronic devices.

In FIG. 1, a scanner device 2 optically reads an image from a document to convert thus read image into a digital image. A printer device 4 outputs the digital image onto a paper device.

A touch panel type operation unit 5 receives an instruction from a user as well as displays a system setting state by using a user interface (UI) screen. A hard disk drive (HDD) 6 composes a nonvolatile memory for storing a program for starting up the image forming apparatus 1, a setting file, and various types of system information such as UI screen data.

A FAX machine 7 transmits the digital image data to, for example, a telephone line. A controller 3 controls a scanner unit 22 to control document reading. The controller 3 prints image data on a recording paper after rendering image data read out by using a marking unit 41 and print data based on a page description language (PDL) received from a computer 9.

The image forming apparatus 1 can input/output a digital image from the computer 9 via the LAN 8, can issue a job, and can provide an instruction to a device.

The scanner device 2 includes a document feeding unit 21 capable of automatically exchanging a bundle of documents and a scanner unit 22 capable of optically scanning each document to convert thus scanned document into a digital image. Thus converted image data is transmitted to the controller 3.

The printer device 4 includes a paper feeding unit 42 capable of sequentially feeding documents sheet by sheet from the bundle of documents, a marking unit 41 for printing the image data on a fed paper, and a sheet discharging unit 43 for discharging a paper after printed.

The image forming apparatus 1 can execute various kinds of jobs. An example of each functional processing of the multiple functional processing is described below.

Copying Function

The image read from the scanner device 2 is recorded in the HDD 6 concurrently with printing thereof by using the printer device 4.

Image Transmission Function

The image read from the scanner device 2 is transmitted to the computer 9 via the LAN 8.

Image Storage Function

The image read from the scanner device 2 is recorded in the HDD 6, followed by an image transmission and an image printing thereof, as required.

Image Printing Function

A page description language for example, transmitted from the computer 9 is analyzed to be printed by the printer device 4.

Figure 2:
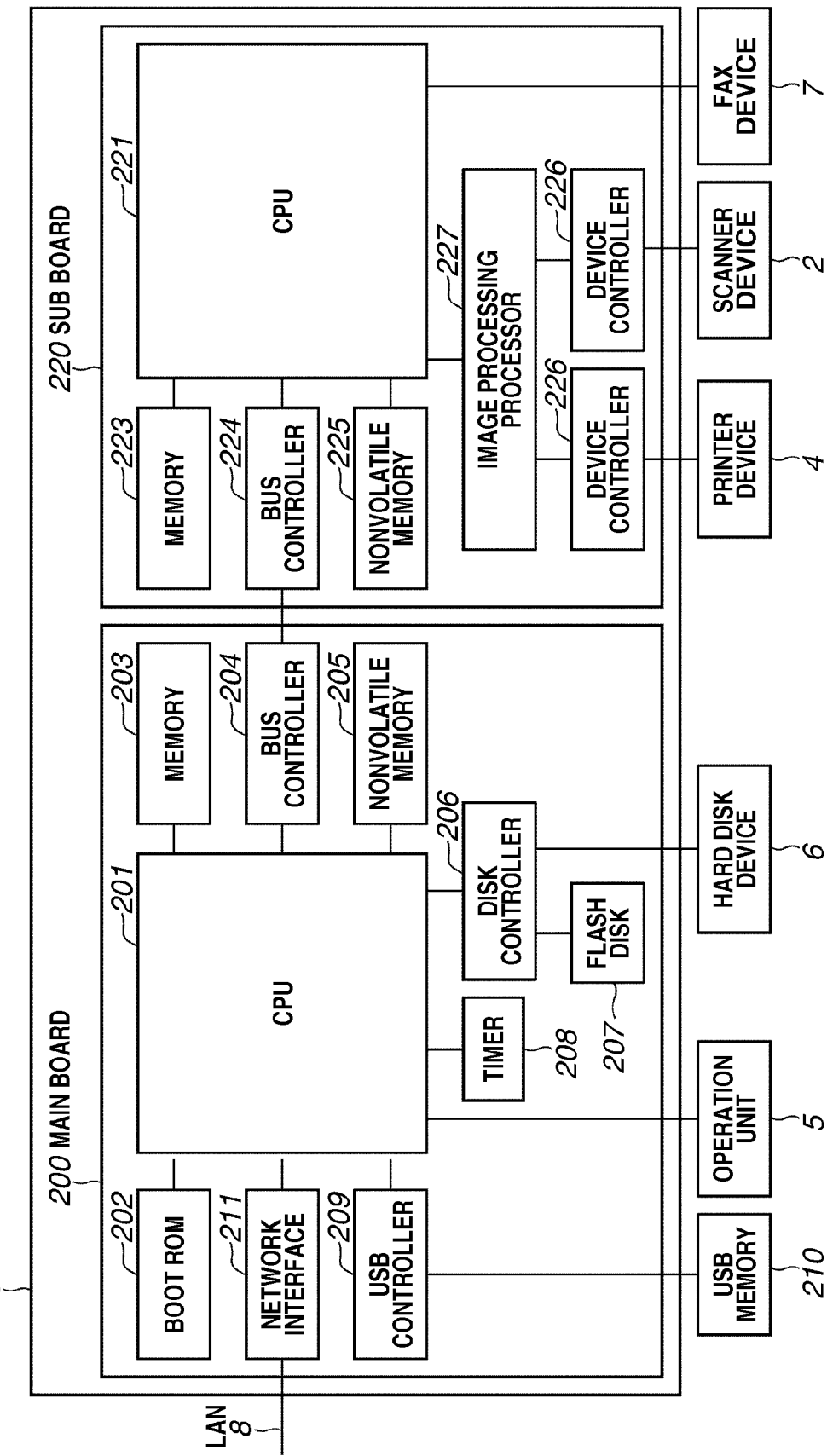
FIG. 2 is a block diagram illustrating a configuration of a controller illustrated in FIG. 1.

FIG. 2 is a block diagram illustrating a configuration of the controller 3 illustrated in FIG. 1. The controller 3 in FIG. 2 includes a main board 200 and a sub board 220. In the present exemplary embodiment, an example that, while the memory 203 shifts to a power saving mode, the memory 203 is used as a first storage unit for storing information for causing the system to be returned and a flash disk 207 is used as a second storage unit is described.

In FIG. 2, a main board 200 is configured with a general central processing unit (CPU) system. The main board 200 includes a CPU 201 for controlling the entire board, a boot ROM 202 including a boot program, and a volatile memory 203 to be used as a work memory by the CPU 201. The main board 200 further includes a bus controller 204 having a bridging function for establishing a connection with an external bus and a nonvolatile memory 205 which does not loose data in a case where a power supply is turned off. The memory 203 is used as a storage unit for storing information for causing the power supply to return to the ON state after the power supply shifts from the ON state to a suspended state. The information for returning to the ON state is written according to write processing (i.e., first write processing) by the CPU 201. As described below, processing in which the CPU 201 writes into the flash disk 207 the information written in the memory 203 for returning is referred to as second write processing. FIG. 2 also illustrates a network interface 211.

The main board 200 further includes a disk controller 206 for controlling the storage device and the flash disk (e.g., a solid state drive (SSD)) 207 as a nonvolatile storage configured with a semiconductor device, having a relatively small capacity. The main board 200 still further includes a timer 208 supplied from a built-in buttery with electric power for its operation and a universal serial bus (USB) controller 209 capable of controlling a USB. The SSD is an example of a semiconductor disk memory. The main board 200 is connected to external devices such as a USB memory 210 and the operation unit 5 and the HDD 6 illustrated in FIG. 1.

The sub board 220 includes a relatively small sized general-purpose CPU system and image processing hardware. The sub board 220 includes a CPU 221 for controlling the entire board and a memory 223 to be used as a work memory by the CPU 221. The sub board 220 includes a bus controller 224 having a bridging function for establishing a connection with external bus and a nonvolatile memory 225 which does not loose data after the power supply is turned off.

The sub board 220 includes an image processing processor 227 for performing real-time digital image processing and a device controller 226. The external scanner device 2 and the external printer device 4 perform data passing of digital image data via the device controller 226. The FAX device 7 is directly controlled by the CPU 221.

FIG. 2 is a simplified block diagram. For example, the CPU 201 and the CPU 221 include lots of CPU peripheral hardware such as a chip set, a bus bridge, and a clock generator. However, they are omitted here because a detailed description thereof is not necessary here according to a granularity of description. The configuration of the block diagram does not limit the scope of the claims of the present invention. An operation of the controller 3 is described below exemplifying image copy processing in which the controller 3 reads a document image to print it.

When a user instructs image copying via the operation unit 5, the CPU 201 transmits an image reading command to the scanner device 2 via the CPU 221 of the sub board 220. The scanner device 2 optically scans the paper original, converts it into digital image data, and inputs the converted data into the image processing processor 227 via the device controller 226. The image processing processor 227 transfers the digital image data to the memory 223 via the CPU 221 of the sub board 220 according to a direct memory access (DMA) transfer and temporarily stores the digital image data in the memory 223. If the CPU 201 can confirm that a certain amount of or the entirety of the digital image data is stored in the memory 223, the CPU 201 provides an image output instruction to the printer device 4 via the CPU 221.

The CPU 221 of the sub board 220 teaches a position of the image data of the memory 223 to the image processing processor 227. The CPU 221 transfers the image data on the memory 223 to the printer device 4 via the image processing processor 227 and the device controller 226 according to a synchronization signal from the printer device 4. The digital image data is printed onto a paper device by the printer device 4.

Figure 3:
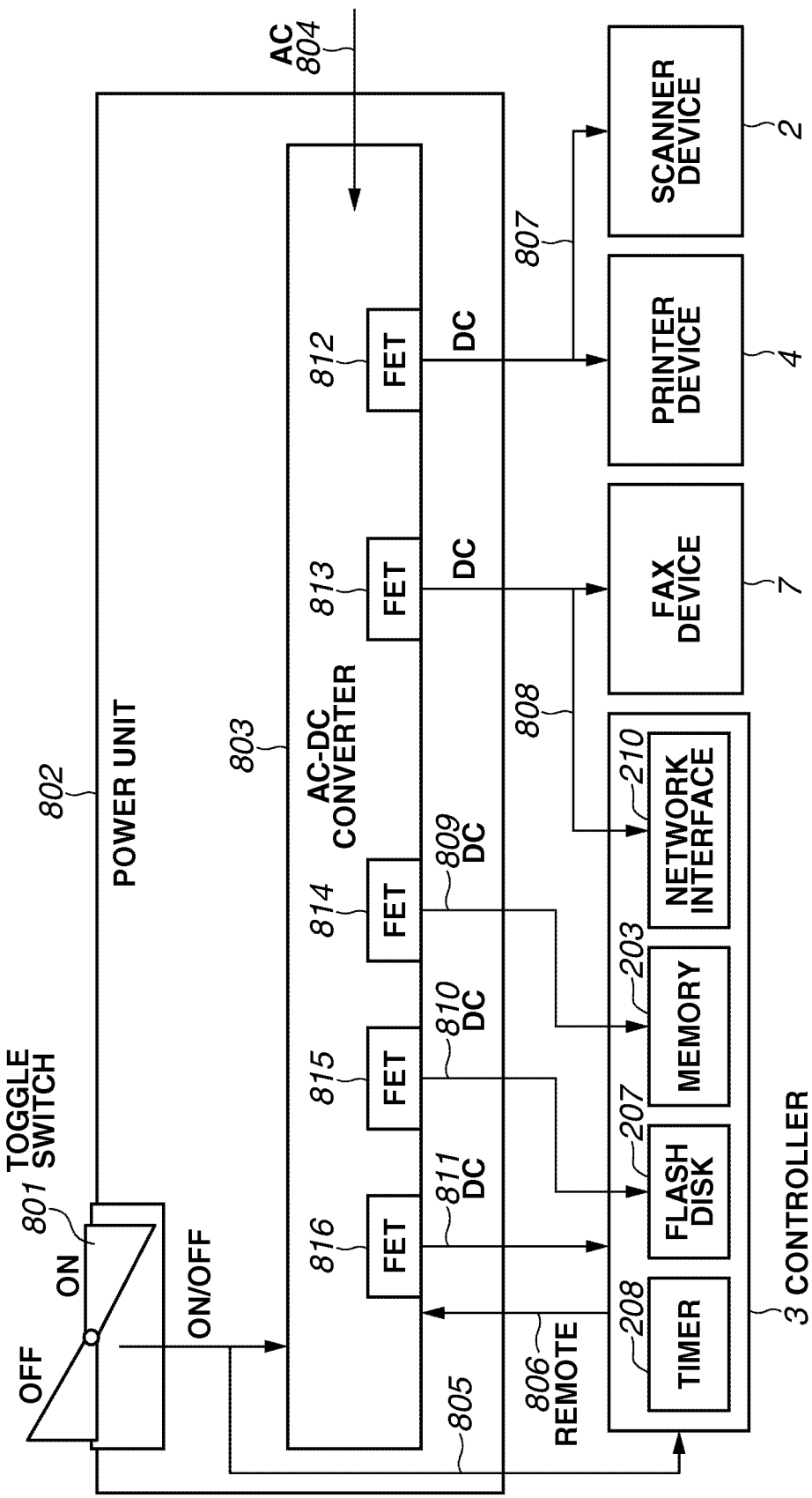
FIG. 3 illustrates a configuration of a power unit of an image forming apparatus illustrated in FIG. 1.

In a case of making a plurality of numbers of print copies, the CPU 201 stores in the HDD 6 the image data of the memory 223. Thus, the CPU 201 can transmit an image to the printer device 4 on and after the second print copy without acquiring the image from the scanner apparatus 2. FIG. 3 illustrates a configuration of a power unit of the image forming apparatus 1 illustrated in FIG. 1. Components identical to those of FIGS. 1 and 2 are provided with the same numerical numbers and/or symbols.

FIG. 3 illustrates a toggle switch 801, a power unit 802, an alternating current to direct current converter (AC-DC converter) 803, an alternating current (AC) power input unit 804, and a switch input line 805. The switch input line 805 notifies the controller 3 of an operation state of the toggle switch 801 operated by the user. A power supply remote signal 806 is output from the controller 3 to the AC-DC converter 803 as a signal for controlling the output of the AC-DC converter 803. The AC-DC converter 803 is equipped with a plurality of field effect transistors (FET) 812 through 816.

A power cable 807 supplies a direct current (DC) power to the printer device 4 and the scanner device 2. A power cable 808 supplies power to the FAX device 7 and the network interface 210 of the controller 3. A power cable 809 supplies power to the memory 203 of the controller 3. A power cable 810 supplies power to the flash disk 207 of the controller 3. A power cable 811 supplies power to the other components of the controller 3.

The FETs 812 through 816 provided to the AC-DC converter 803 serve as switches capable of turning on/off the power supply lines 807 through 811, respectively. The FETs 812 through 816 can be controlled independently by the above described power supply remote signal 806. The user operates the toggle switch 801 to turn on/off the power supply of the apparatus.

The toggle switch 801 is connected to the AC-DC converter 803 when the power supply is turned on, thereby capable of controlling the energized state of the power supply.

On the other hand, when the power supply is turned off, the power supply should not be stopped until the controller 3 completes a shutdown of the system. More specifically, the state of the power switch 801 is notified to the controller 3 via the line 805 to thereby allow all the DC power supplies to be turned off by using the power supply remote signal 806 after the completion of the shutdown of the system. Above description is applicable to a configuration of the power supply system included in the general device requiring a shutdown operation.

The toggle switch 801 mechanically keeps either one of an ON state or an OFF state of the power supply. The user inputs the state by an operation to turn over the toggle switch 801 to either one of a side of the ON state or a side of the OFF state.

In the present exemplary embodiment, the toggle switch in which the ON state and the OFF state are explicit is used. However, many personal computers (PCs) employ a power switch without states (i.e., including a power switch which in itself functions as a power-saving shifting switch). The switches with no state include control patterns as follows. 1. The switch functions as the "OFF" state while the power supply of the apparatus is turned on. 2. The switch functions as the "ON" state while the power supply of the apparatus is turned off. 3. The switch inputs a "forcible OFF" state by a continuous pressing of the switch for a period of time equal to or more than a predetermined period of time. In the present exemplary embodiment, the switch to be employed is not limited to the toggle switch but the switch with no state may be employed. In a case of the switch with no state is employed, the ON/OFF state of the toggle switch can be applied to the ON/OFF patterns of the above described 1 and 2.

Figure 4:
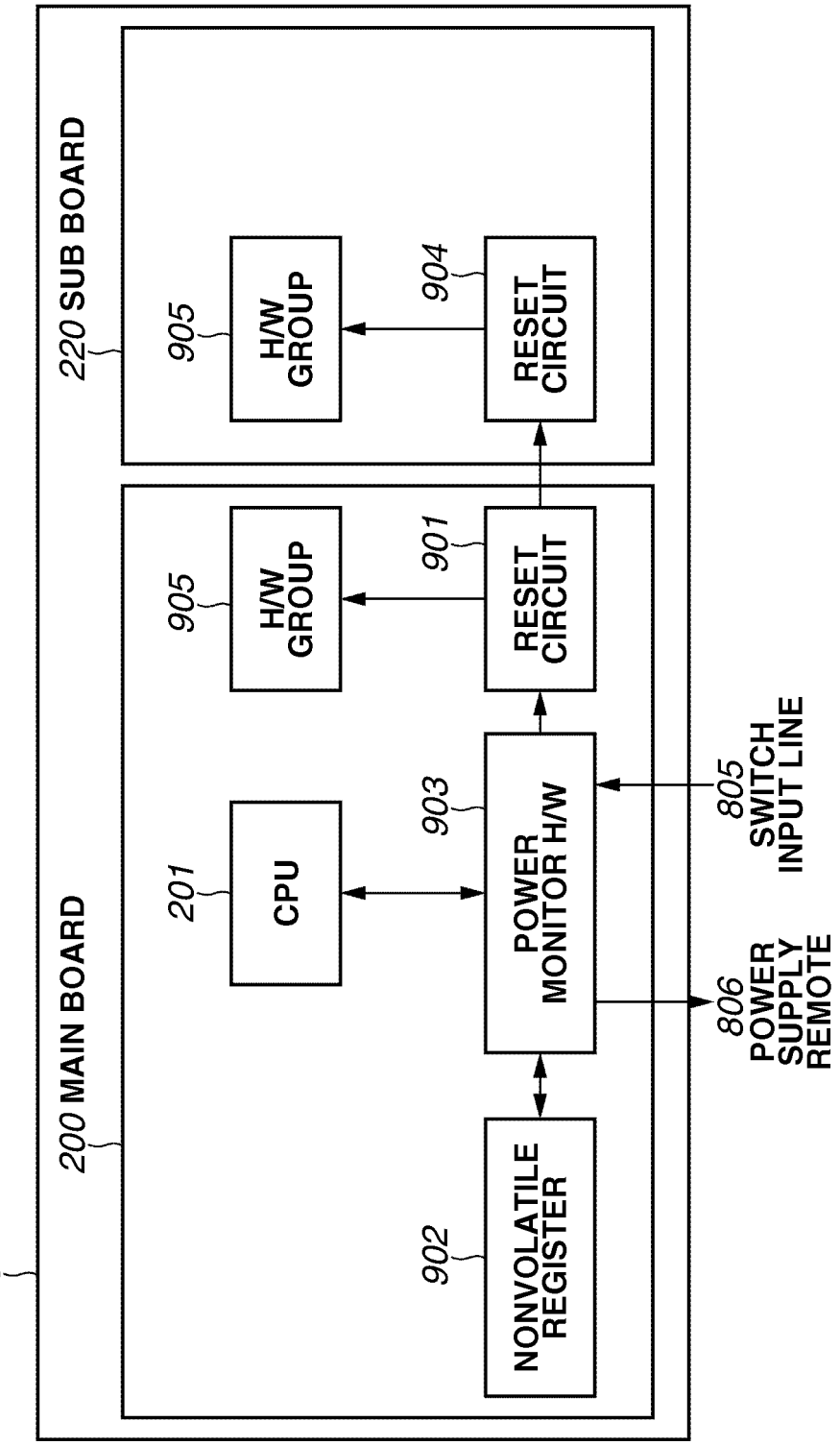
FIG. 4 is a block diagram illustrating a configuration of the controller illustrated in FIG. 2.

FIG. 4 is a block diagram illustrating a configuration of the controller 3 illustrated in FIG. 2. FIG. 4 mainly illustrates a configuration focusing on around a power supply control and a reset circuit in the controller 3.

FIG. 4 illustrates a reset circuit 901 on the main board 200. A nonvolatile register 902 is not reset by a hardware (H/W) reset. A power monitor H/W logic unit 903 dedicated to monitor a power supply control of the present system. In a case where the power supply monitor H/W logic unit 903 is, for example, an application specific integrated circuit (ASIC), a smaller CPU system may be employed. FIG. 4 further illustrates a reset circuit 904 on the sub board 220 and a H/W group 905 on each board.

An inside state of an synchronous type H/W is reset by an reset operation, so that a H/W circuit composed of the synchronous type H/W is required to have such a configuration that the reset circuits 901 and 904 are required to reset each corresponding H/W group 905 after the power is supplied to each chip upon turning on the power supply. Since a plurality of H/W chips has a master-slave relationship, a reset sequence is d to be designed to sequentially reset the H/W groups.

Therefore, as similar to the present exemplified embodiment, generally, a singular board is provided with a singular reset circuit thereon and thus a reset operation in each board is performed by the corresponding reset circuit. Specifically, a system of the main board 200 is a main board of the present apparatus and thus has power supply monitor H/W unit 903.

A state of the toggle switch 801 is connected to the switch input line 805. The toggle switch 801 has a function capable of controlling a power supply to each unit of the image forming apparatus by using the power supply remote signal 806.

In a case where the CPU 201 can normally operates, the system can be reset according to an instruction of the CPU 201. In a case where the power is not supplied to the CPU 201, the controller 3 can be powered on by controlling the power supply remote signal 806 via the input of the switch input line 805 connected to the toggle switch 801. The nonvolatile register 902 can be read and written via the CPU 201.

In the image forming apparatus having the above described H/W configuration, for example, when the user turns the toggle switch 801 off, the CPU 201 can receive the state of the toggle switch 801 via a pathway of the line 805 and the power supply monitor H/W unit 903. Generally, the CPU 201 detects the turning off of the power supply to start the shutdown sequence as well as provide a shutdown instruction to the power supply monitor H/W unit 903.

As a result thereof, the turning off of the power supply is notified to the AC-DC converter 803 via the power supply remote signal 806, thereby turning off the power supply lines 807 through 811 for supplying the DC power. Accordingly, the present system is completely shutdown.

The above described operation is the typical operation performed in the image forming apparatus. In the image forming apparatus of the present exemplary embodiment, the above described operation corresponds to an operation performed in a case where the starting time shortening function is not enabled. In the shutdown operation, since a program on the CPU 201 is also completely terminated, the program of the CPU 201 is to be activated normally when the toggle switch 801 is turned on next time.

Figure 5:
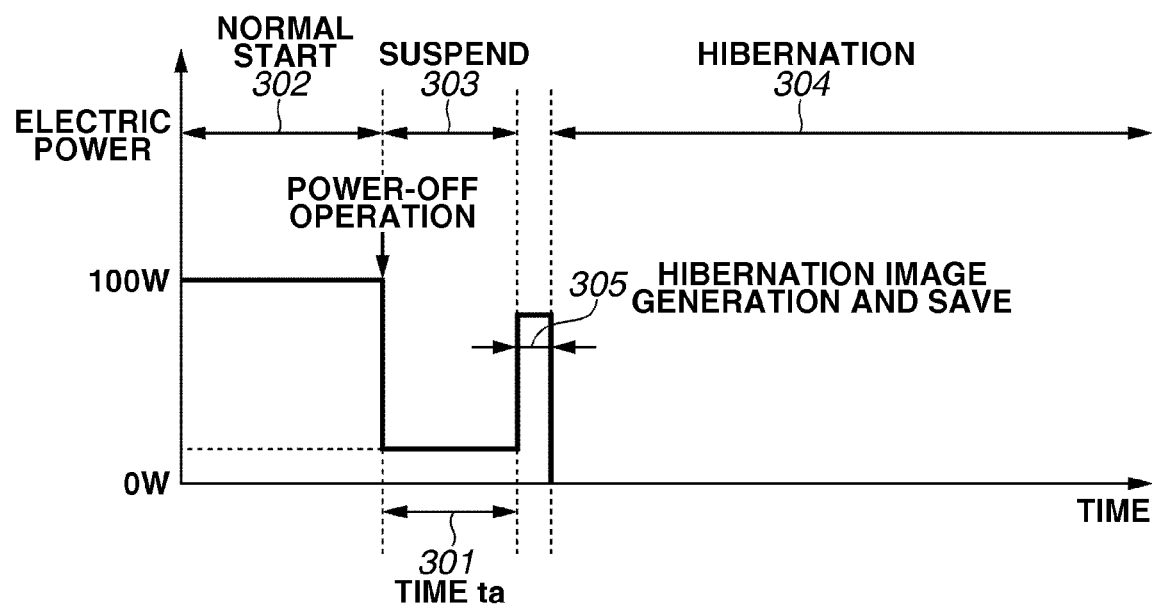
FIG. 5 is a timing chart illustrating a start-up processing of the job processing apparatus.
Figure 6:
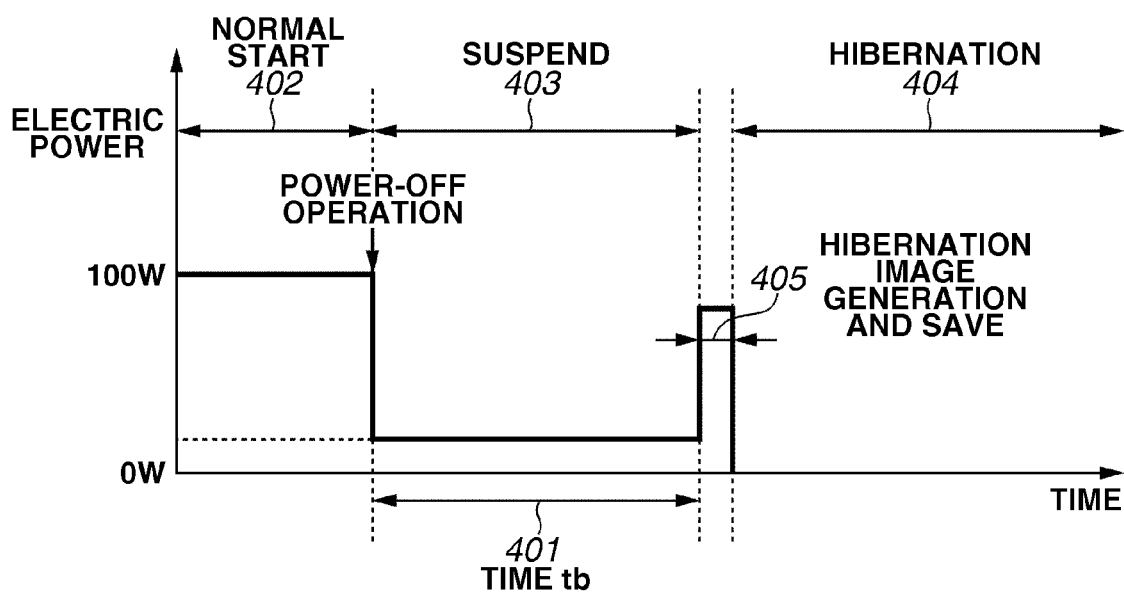
FIG. 6 is another timing chart illustrating a start-up processing of the job processing apparatus.

FIGS. 5 and 6 are timing charts illustrating how to start up a job processing apparatus according to the present exemplary embodiment. FIGS. 5 and 6 illustrate a power shift of a power supply off-operation post-processing for shortening the system starting time at the next power-on. FIG. 5 illustrates an example of a power supply off-operation post-processing in a state where a life of the flash disk 207 as the nonvolatile storage affects less to a service life of the image forming apparatus.

Figure 10:
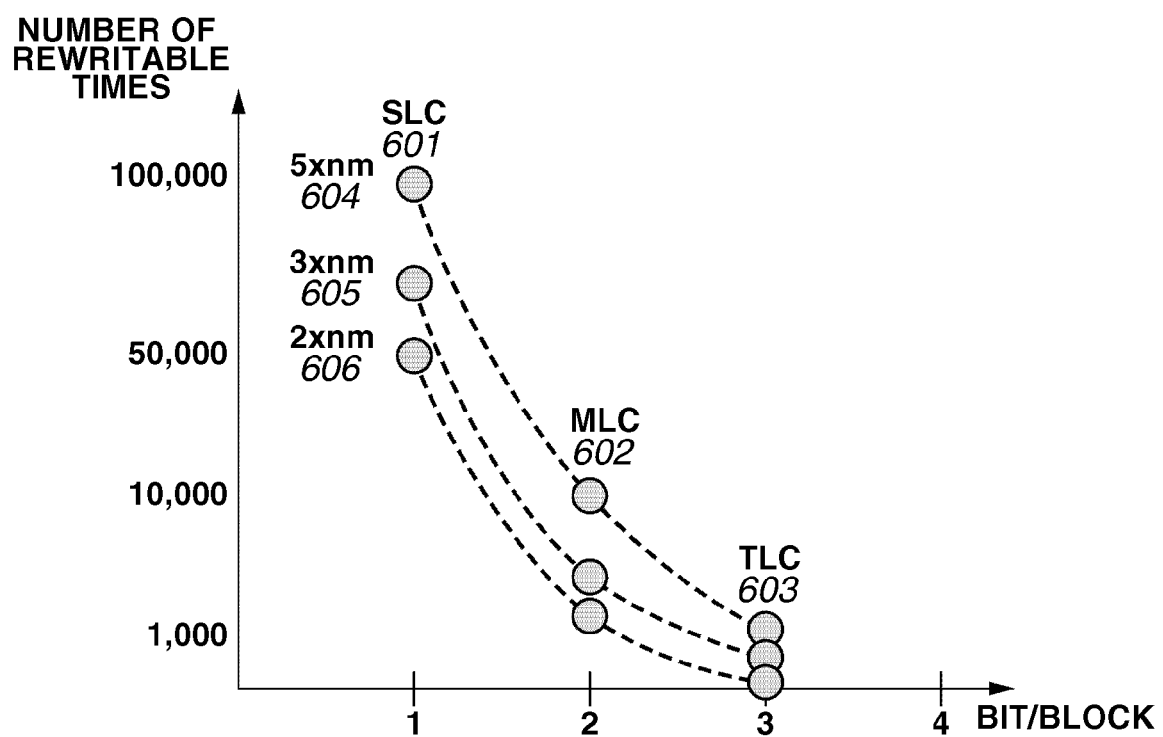
FIG. 10 is a performance mapping of the number of rewritable times per Block of a flash memory.

In the timing chart of FIG. 5, after the operation to turn off the power supply of the image forming apparatus, the image forming apparatus shifts to a low power consumption state of the suspended state 303 and, after a predetermined suspended time (ta) 301 has lapsed, the image forming apparatus further shifts to the hibernation state 304. The number of times the image forming apparatus can shifts to the hibernation state in one day is determined according to a size of the hibernation image. For example, it is provided that the MLC type flash disk 207 of a capacity of 4 giga bytes (GB) and the memory 203 of a capacity of 2 GB of FIG. 10 are installed in the image forming apparatus. The suspended state 303 is a power saving state more power-saving than a state that the power supply-on state (i.e., a normal start state 302). The suspended time (ta) 301 is a period of time during the suspended state.

In order to suppress the volume of the hibernation image, only information required for the start-up of the system information on the memory 203 is formed into the hibernation image and thus the hibernation image size is set to 300 MB (mega-bytes).

The flash disk 207 includes a program area of 300 MB for starting the system and the HDD 6 is used for storing the image data. Therefore, a rewritable area capable of being rewritten into a hibernation image is 3.7 GB as an empty area of the flash disk 207.

In the flash disk 207 of a capacity of 4 GB used here, it is provided that the total number of blocks per GB is 7,860 Blocks, a capacity per Block is 128 KB, the number of writable times per Block is 1,000 times, and a writing unit is 4 KB. It is provided that the service life of the image forming apparatus is 5 years, the number of days for using the image forming apparatus is 30 days, and the number of currently rewritten times is 20 million times. At the time, a total rewritable capacity of the flash disk 207 is expressed by the following Equation (1).

total rewritable capacity=capacity of flash disk×total number of blocks×capacity per Block×number of rewritable times per Block     Equation (1)

In the light of the above description, in the flash disk 207, a rewritable area capable of being rewritten into the hibernation image of 3.7 GB, a total number of blocks of 7,860 Blocks, a capacity per Block of 128 KB, and a number of rewritable times per Block of 1,000 times are substituted into the Equation (1). The total rewritable capacity of the flash disk 207 becomes about 3,722 GB.

As shown in Equation (2), the number of times the apparatus can shift to the hibernation per day can be calculated by dividing the total rewritable capacity of the flash disk 207 with the hibernation image size of 300 MB and number of days of an apparatus useful life.

number of times the apparatus can shift to hibernation state per day=total rewritable capacity/(hibernation image size×number of days of apparatus service life)     Equation (2)

The number of days of the apparatus service life can be calculated by multiplying the above described apparatus service life of 5 years by 365 days. Accordingly, the number of days of apparatus service life of 1,825 days (=5 years×365 days), the total rewritable capacity acquired in Equation (1) of 3,722 GB, and the above described hibernation image size of 300 MB are substituted into Equation (2), resulting in obtaining the number of times the apparatus can shift to the hibernation per day of about 7 times. A hibernation shifting time interval per day can be calculated by dividing a day of 24 hours with the number of times the apparatus can shift to the hibernation state per day according to Equation (3) described below.

$$\text{hibernation shifting time interval per day} = 24 \text{ hours}/ \\ \text{number of times the apparatus can shift to hibernation state per day} \quad \text{Equation (3)}$$

As described above, when the number of times the apparatus can shift to the hibernation state per day of 7 times is substituted into Equation (3), about 3 hours and 30 minutes is obtained as the hibernation shifting interval per day. Here, in the nonvolatile storage, a large temperature change is generated as the power supply is turned on or turned off.

Such a large temperature change may invite a housing expansion or an interior deterioration of the nonvolatile storage, so that frequent turning on/off will be a factor of malfunction of the nonvolatile storage.

Therefore, in the light of a protection of the nonvolatile storage, the suspended time (ta) is set to a value with a spare time in addition to the tree hours obtained as a result of Equation (3), i.e., set to 4 hours. The suspended time (ta) may be configured such that the user can change the setting time via the operation unit 5. When the apparatus shifts to the hibernation state, the hibernation image is required to be generated and saved. Therefore, the controller 3 and the flash disk 207 are required to be energized, which invites a temporal increase of the power supply (305 in chart). The controller 3 may be provided with a built-in buttery and thus the power required in generating and saving the hibernation image is obtained by the power supplied from the built-in buttery so as to suppress the increase of the power supply.

FIG. 6 illustrates an example of processing after the power supply off-operation when a life time of the flash disk 207 as the nonvolatile storage affects largely on the service life of the image forming apparatus. In the time chart as illustrated in FIG. 6, the image forming apparatus shifts to the suspended state 403 after the power supply of the image forming apparatus is turned off and the image forming apparatus further shifts to the hibernation state 404 after a suspended time (tb) 401 has lapsed. The suspended state 403 is a power saving state more power-saved than when the power supply is turned on (i.e., normal start state 302). FIG. 6 illustrates a normal start state 402.

Similarly to above description, when the apparatus shifts to the hibernation state, the hibernation image should be generated and saved during the shifting time 405. Therefore, the controller 3 and the flash disk 207 are required to be energized, which invites a temporal increase of the power supply. The suspended time (tb) 401, longer than the above described suspended time (ta) 301, is determined by a remaining amount of life time of the nonvolatile storage (i.e., the flash disk 207).

According to the following Equation (4-1), a threshold of the rewritable capacity per day can be calculated by dividing the above described total rewritable capacity with the number of days of the image forming apparatus service life of 1,825 days.

$$\text{threshold of rewritable capacity per day} = \text{total rewritable capacity/number of days of apparatus useful life} \quad \text{Equation (4-1)}$$

In the light of the above description, when the total rewritable capacity of 3,722 GB and the number of days of the image forming apparatus service life of 1,825 days are substituted into Equation (4-1), a threshold of the rewritable capacity per day becomes about 2,040 MB.

According to the following Equation (4-2), a threshold of the number of rewritable times of the flash disk 207 per day can be calculated by dividing a threshold of the rewritable capacity per day with a rewrite unit with respect to the flash disk 207.

$$\text{threshold of number of rewritable times per day} = \text{threshold of rewritable capacity per day/rewrite unit} \quad \text{Equation (4-2)}$$

In the light of the above description, when the threshold of the rewritable capacity per day of about 2,040 MB and the rewrite unit of 4 KB are substituted into Equation (4-2), the threshold of the number of rewritable times per day becomes about 500,000 times. If the threshold of the number of rewritable times per day is added up by the number of days the apparatus is used, a threshold of the number of rewritable times at the time of the number of days the apparatus is used can be calculated. In the light of the above description, the suspended time tb can be calculated based on the following Equation (4-3) in which ratio of the suspended time ta and the suspended time tb and the number of currently rewritten times and a threshold of the number of rewritable times at the time of the number of days the apparatus is used are calculated.

$$\text{suspended time } tb = (\text{suspended time } ta \times \text{number of currently rewritten times})/(\text{threshold of number of rewritable times per day} \times \text{number of days apparatus is used}) \quad (4\text{-}3)$$

In the light of the above description, the time (ta) of four hours, the number of currently rewritten times with respect to the flash disk of 20 million times, a threshold of the number of rewritable times per day of 500,000 times, and the number of days the apparatus is used of 30 days are substituted into Equation (4-3), the suspended time (tb) can be obtained as about five hours. The suspended time tb is calculated based on the suspended time ta as a fixed value, however, the next suspended time may be calculated and set based on thus calculated suspended time tb.

Figure 7A:
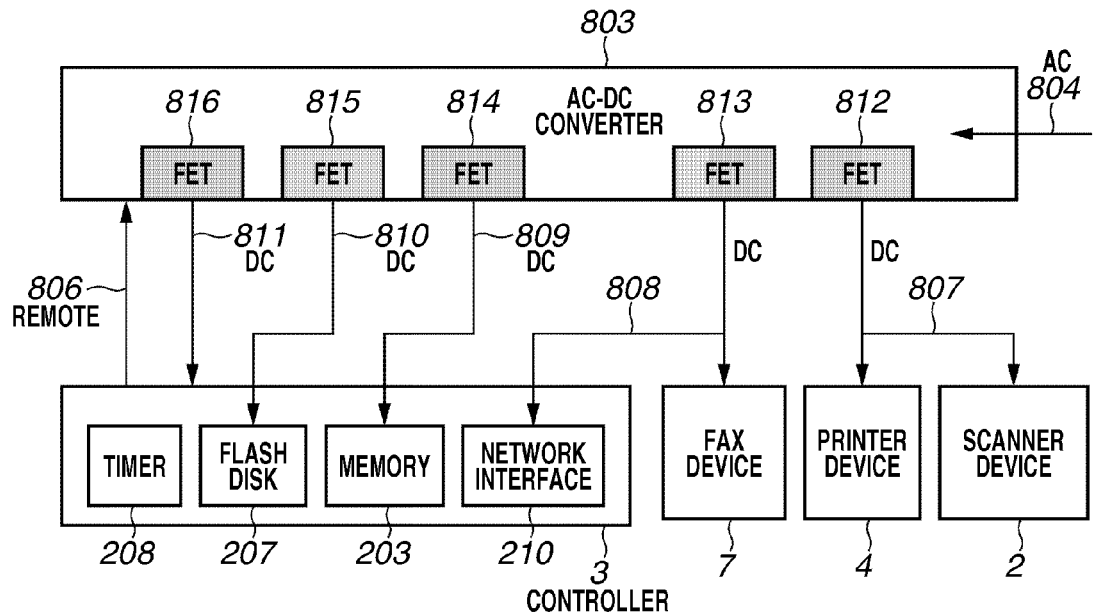
Figure 7B:
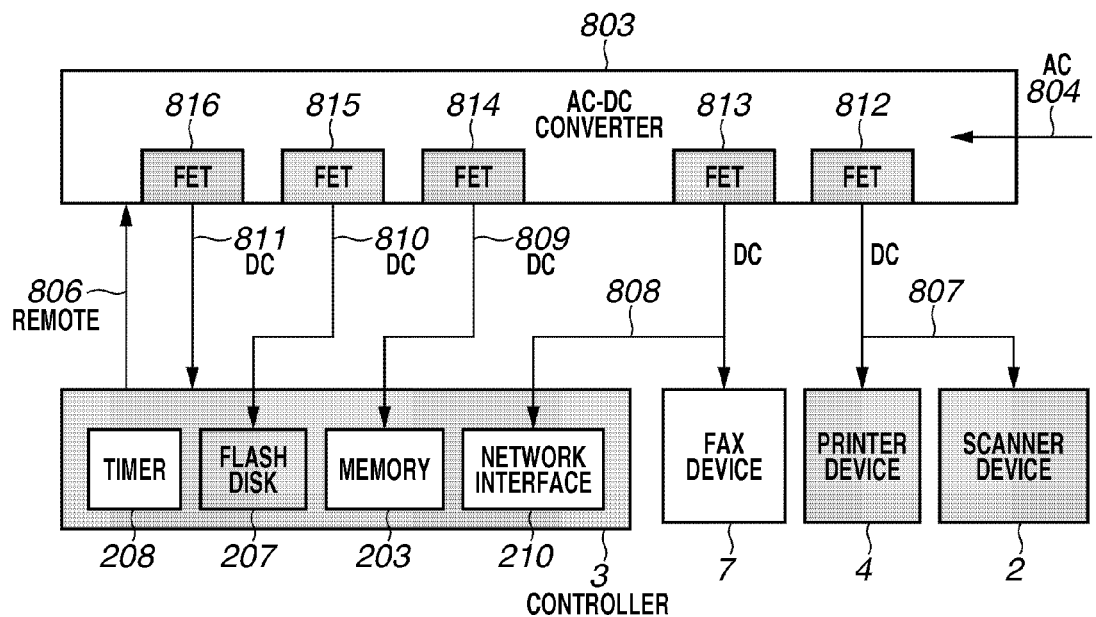

FIGS. 7A through 7D illustrate the power supply control state of the job processing apparatus according to the present exemplary embodiment. FIGS. 7A through 7D illustrate examples of processing for shortening the system starting time at the next time when the image forming apparatus is turned on. FIG. 7A illustrates a power supply ON state. For example, in the PC 9, the user sets a time (not illustrated) before the apparatus comes into a sleep state (i.e., the suspended state) and a time until the user turns off the power supply of the HDD 6 (i.e., the hibernation state). After a predetermined time has lapsed from a time at which the image forming apparatus shifts to the suspended state as illustrated in FIG. 7B, a hibernation image is generated based on the system information on the memory.

After the hibernation image is saved in the HDD or a nonvolatile storage such as a flash memory, the image forming apparatus shifts to the hibernation shifting state illustrated in FIG. 7C, the image forming apparatus further shifts to the hibernation state of FIG. 7D, and thereafter the nonvolatile storage is turned off.

FIG. 8 is a flow chart illustrating a control method for controlling the job processing apparatus according to the present exemplary embodiment. FIG. 8 illustrates an example of system processing after the power supply off-operation. Each step is realized such that the CPU 201 executes a control program to be loaded to the memory 203. A threshold of the number of rewritable times is calculated based on the number of writing times with respect to the flash disk 207 and the writing unit with respect to the flash disk 207. Such an example that the suspended time of the CPU 201 shifting from the suspended state to the OFF state is set variably is described based on the threshold of thus calculated number of rewritable times and the number of writing times. Such a control that, after the suspended time different from the set suspended time has lapsed, the CPU 201 causes the power supply to shift to the OFF state is described below.

Upon starting the processing, the power supply of the apparatus is in the ON state as illustrated in FIG. 7A and thus all the devices installed in the apparatus are energized. In step S501, after the power supply of the apparatus is turned off, in step S502, the CPU 201 obtains the number of currently rewritten times of the flash disk 207.

The number of currently rewritten times is obtained from a parameter of the number of currently rewritten times according to self diagnostic function information stored in the flash disk 207. The self diagnostic function means a self-monitoring, analysis and reporting technology (SMART).

As the other method, the number of rewrite times with respect to the flash disk 207 is monitored or another storage device (e.g., the HDD 6) is provided. The CPU 201 may obtain the number of rewrite times of the flash disk 207 stored in the HDD 6 after the power supply off-operation in step S501. The present exemplary embodiment employs a method for obtaining the parameter of the number of currently rewritten times of the SMART information requiring relatively less processing time.

In step S503, the CPU 201 calculates a difference between the number of currently rewritten times of the flash disk 207 obtained from the SMART information and the number of rewritable times at the time of the number of days the apparatus is used as an integrated value of the result of the Equation (4-2) and the number of days the apparatus is used and the resulting value is substituted into, for example, a variable J.

In step S504, the CPU 201 makes a positive-or-negative determination of the variable J. In a case where the CPU 201 determines that the variable J is a positive number, i.e., in a case where thus acquired number of currently rewritten times of the flash disk 207 does exceed the number of rewrite times at the time of the number of days the apparatus is used, the processing proceeds to step S505 (NO in step S504). In step S505, the CPU 201 sets the "ta" to the timer 208 as the suspended time. In step S506, the job processing apparatus shifts to the suspended state.

On the other hand, in step S508, in a case where the CPU 201 determines that the variable J is a negative number, i.e., in a case where the CPU 201 determines that thus obtained number of currently rewritten times of the flash disk 207 exceeds the threshold of the number of rewritten times at the time of the number of days the apparatus is used (YES in step S504), the CPU 201 sets the "tb" to the timer 208 as the suspended time according to Equation (4-3). In step S509, the CPU 201 shifts to the suspended state of FIG. 7B.

As described above, when the job processing apparatus shifts to the suspended state, the AC-DC converter 803, the memory 203, and the FAX device 7 are energized as illustrated in FIG. 7B. As described above, while the job processing apparatus is standby in the state as illustrated in FIG. 7B, the system information on the memory 203 is retained by the memory 203 itself.

After the set suspended time ta has lapsed (YES in step S507) or after the suspended time tb has lapsed (YES in step S510), the timer 208 controls via the power supply remote signal 806 the AC-DC converter to energize the controller 3.

In step S511, in a case where the controller 3 becomes the hibernation shifting state as illustrated in FIG. 7C, the CPU 201 generates the hibernation image from the system information stored in the memory 203. In step S512, when the hibernation image is generated, the hibernation image is saved in the flash disk 207 and, in step S513, the job processing apparatus shifts to the hibernation state. Then, the processing is ended. In a case where the job processing apparatus shifts to the hibernation state, as illustrated in FIG. 7D, all the devices installed in the apparatus become a non-energized state, i.e., is put into a state that an amount of power becomes "0" W.

Figure 9:
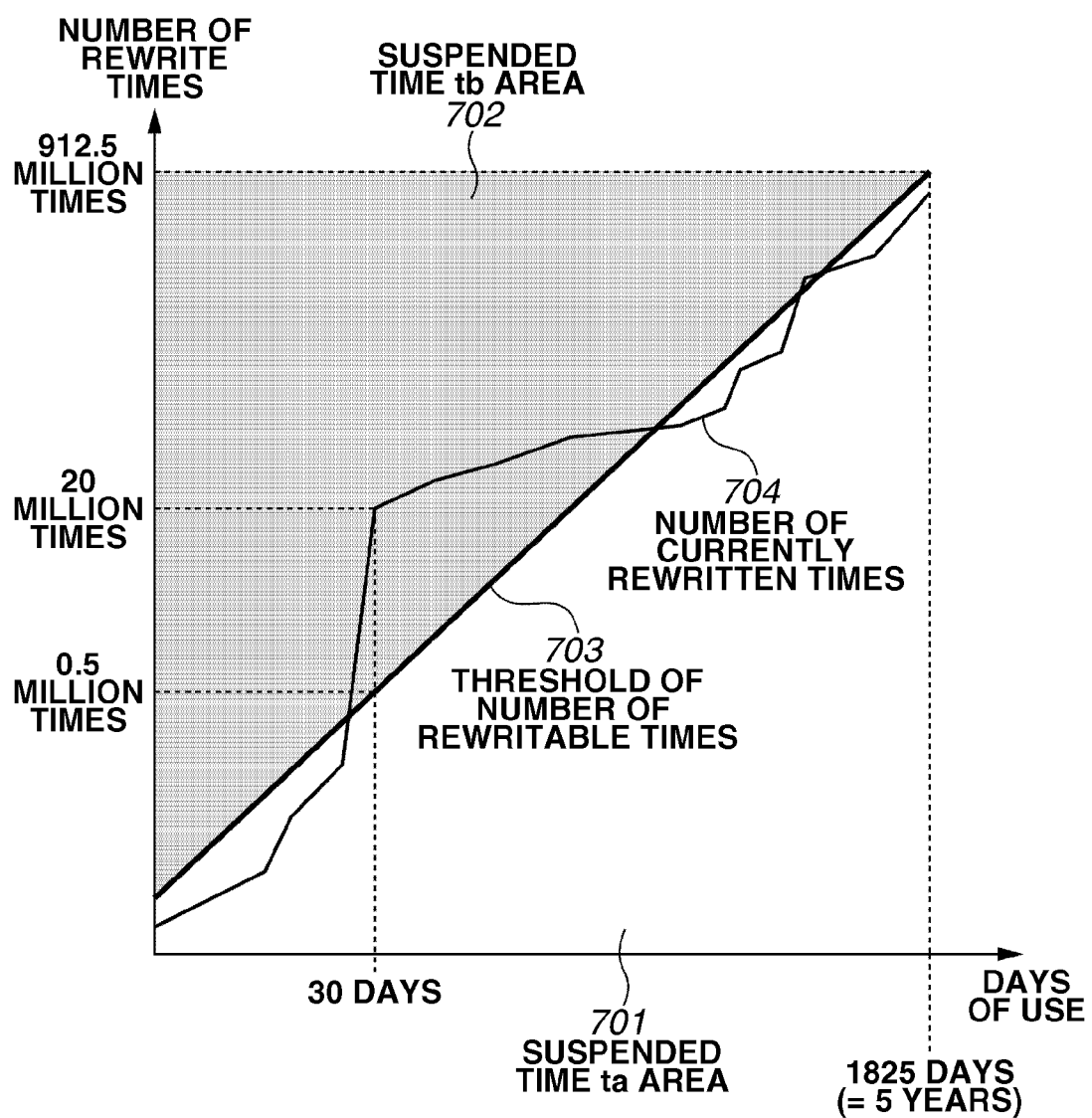
FIG. 9 illustrates a property of a memory in the job processing apparatus.

In the present exemplary embodiment, in a case where thus calculated number of writing times is equal to or less than the threshold determined based on the number of writing times, the suspended time for shifting from the suspended state to the OFF state is set to a shorter time in comparison with a case where thus calculated number of writing times is equal to or more than the threshold (see, FIGS. 5 and 6). FIG. 9 illustrates a property of the memory in the job processing apparatus according to the present exemplary embodiment. FIG. 9 is an example illustrating a relationship between the number of rewrite times with respect to the number of days the apparatus is used and the setting time of the suspended time.

In FIG. 9, the threshold 703 of the number of rewritable times is a threshold of the number of rewritable times at the time of each of the number of days the apparatus is used based on the threshold of the number of rewritable times per day calculated based on Equation (4-2). In a case where the number of currently rewritten times 704 obtained from the SMART information of the flash disk 207 exceeds the threshold 703 of the number of rewritable times, processing to set the suspended time to "tb" is performed. FIG. 9 illustrates a suspended time tb area 702 and a suspended time to area 701. In a case where the number of currently rewritten times 704 obtained from the SMART information of the flash disk 207 does not exceed the threshold 703 of the number of rewritable times, the CPU 201 sets the suspended time to "ta". Processing for changing or setting the suspended time according to the number of rewrite times as illustrated in FIG. 9 may be performed in a unit of time or a unit of day or, alternatively, in a unit of month unit or in a unit of year.

In a case where the processing to set the suspended time to tb is performed for a large number of times or in a case where the total number of currently rewritten times of the flash memory attempts to reach a total number of rewritable times of the flash memory 207 before the service life of the apparatus even when the suspended time is processed to be set to tb, exchange of the flash memory may be encouraged via the operation unit 5 to the user or the administrator.

According to the present exemplary embodiment, even in a case where the power saving control is performed by using the storage units having different properties, the power saving control capable of not extending the time until the system is caused to be returned and not shortening the time until reaching the writing limit can be realized.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., a computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-043961 filed Feb. 29, 2012, which is hereby incorporated by reference herein in its entirety.

What is claimed is:

1. An information processing apparatus shiftable to a hibernation state, the information processing apparatus comprising:
a storage unit configured to store information indicating a state of the information processing apparatus before shift to the hibernation state;
an obtaining unit configured to obtain a number of rewritten times of data with respect to the storage unit;
a shifting unit configured to shift the information processing apparatus to the hibernation state in response to lapse of a predetermined time; and
a setting unit configured to set the predetermined time based on the number of rewritten times obtained by the obtaining unit.

2. The information processing apparatus according to claim 1, wherein the setting unit sets a first setting time in a case where the number of rewritten times is equal to or smaller than a predetermined number of times, and sets a second setting time longer than the first setting time in a case where the number of rewritten times is larger than the predetermined number of times.

3. The information processing apparatus according to claim 1, wherein the storage unit is a nonvolatile storage unit.

4. The information processing apparatus according to claim 1, wherein the storage unit is a solid state drive (SSD).

5. The information processing apparatus according to claim 1, wherein the obtaining unit obtains the number of rewritten times from Self Monitoring Analysis and Reporting Technology (SMART) information stored in the storage unit.

6. The information processing apparatus according to claim 1, wherein power supply to the storage unit is stopped in the hibernation state.

7. The information processing apparatus according to claim 1, further comprising a printing unit configured to print an image on a sheet.

8. The information processing apparatus according to claim 1, further comprising a returning unit configured to cause the information processing apparatus to return from the hibernation state, by rewriting the information stored in the storage unit into a memory.

9. A control method of an information processing apparatus shiftable to a hibernation state, the control method comprising:
a step of storing, into a storage unit, information indicating a state of the information processing apparatus before shift to the hibernation state;
a step of obtaining a number of rewritten times of data with respect to the storage unit;
a step of shifting the information processing apparatus to the hibernation state in response to lapse of a predetermined time; and
a step of setting the predetermined time based on the obtained number of rewritten times.

10. A non-transitory storage medium storing a program for causing an information processing apparatus shiftable to a hibernation state to function as:
a storage unit configured to store information indicating a state of the information processing apparatus before shift to the hibernation state;
an obtaining unit configured to obtain a number of rewritten times of data with respect to the storage unit;
a shifting unit configured to shift the information processing apparatus to the hibernation state in response to lapse of a predetermined time; and
a setting unit configured to set the predetermined time based on the number of rewritten times obtained by the obtaining unit.

* * * * *